(12) United States Patent
Dayton

(10) Patent No.: US 11,268,480 B2
(45) Date of Patent: Mar. 8, 2022

(54) VAPOR IMPERMEABLE SOLENOID FOR FUEL VAPOR ENVIRONMENT

(71) Applicant: Eaton Intelligent Power Limited, Dublin (IE)

(72) Inventor: Robert Andrew Dayton, Attica, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/111,406

(22) Filed: Dec. 3, 2020

(65) Prior Publication Data

US 2021/0088005 A1  Mar. 25, 2021

Related U.S. Application Data

(63) Continuation of application No. 16/160,462, filed on Oct. 15, 2018, now Pat. No. 10,895,223.

(51) Int. Cl.
*F02M 25/08* (2006.01)
*B60K 15/03* (2006.01)
(Continued)

(52) U.S. Cl.
CPC ............ *F02M 25/08* (2013.01); *B60K 15/03* (2013.01); *B60K 15/035* (2013.01);
(Continued)

(58) Field of Classification Search
CPC .. F02M 25/08; F02M 25/0836; F02M 25/089; F02M 2025/0845; F16K 31/02;
(Continued)

(56) References Cited

U.S. PATENT DOCUMENTS 3,707,992 A * 1/1973 Ellison ................ F16K 31/0627
137/625.65
4,074,700 A * 2/1978 Engle .................. F16K 31/0627
137/625.27
(Continued)

FOREIGN PATENT DOCUMENTS

CN  103314190 A   9/2013
CN  203374938 U   1/2014
(Continued)

OTHER PUBLICATIONS

U.S. Appl. No. 16/160,462, filed Oct. 15, 2018.
(Continued)

*Primary Examiner* — John M Zaleskas
(74) *Attorney, Agent, or Firm* — RMCK Law Group PLC

(57) ABSTRACT

A vapor impermeable solenoid for a fuel tank isolation valve assembly an outer housing defining an inner cavity, windings configured to generate a magnetic flux when energized, and a flux collector configured to direct the magnetic flux. An armature tube is disposed within the inner cavity inboard of the flux collector and formed of a magnetic and vapor impermeable material configured to prevent fuel vapor molecules from passing therethrough. A pole piece is disposed within the armature tube, and a magnetic armature is disposed within the armature tube and operably coupled to a seal configured to selectively seal a passage that allows fuel vapor to pass to a purge canister. The magnetic armature is configured to move from a first position to a second position when an electric current is applied to the windings.

19 Claims, 7 Drawing Sheets

(51) Int. Cl.

| | |
|---|---|
| *B60K 15/035* | (2006.01) |
| *F16K 31/02* | (2006.01) |
| *H01F 7/08* | (2006.01) |
| *H01F 7/129* | (2006.01) |
| *H01F 7/16* | (2006.01) |
| *H01F 27/29* | (2006.01) |
| *H01F 27/32* | (2006.01) |

(52) U.S. Cl.
CPC ..... *B60K 15/03519* (2013.01); *F02M 25/089* (2013.01); *F16K 31/02* (2013.01); *H01F 7/081* (2013.01); *H01F 7/129* (2013.01); *H01F 7/1607* (2013.01); *H01F 27/29* (2013.01); *H01F 27/325* (2013.01); *B60K 2015/03302* (2013.01); *F02M 2025/0845* (2013.01); *H01F 2007/086* (2013.01)

(58) Field of Classification Search
CPC ...... F16K 31/0655; H01F 7/081; H01F 7/129; H01F 7/1607; H01F 2007/086; H01F 27/325; B60K 15/03302; B60K 15/035; B60K 15/03519
See application file for complete search history.

(56) References Cited

U.S. PATENT DOCUMENTS

| | | | |
|---|---|---|---|
| 4,539,542 A * | 9/1985 | Clark | H01F 7/13 335/261 |
| 4,783,044 A * | 11/1988 | Ellison | F16K 31/404 251/129.15 |
| 4,882,558 A | 11/1989 | Takayanagi | |
| 5,127,624 A * | 7/1992 | Domke | F16K 31/0606 137/625.65 |
| 5,467,962 A | 11/1995 | Bircann et al. | |
| 5,494,255 A | 2/1996 | Pearson et al. | |
| 5,605,318 A * | 2/1997 | Malone | F25B 41/31 251/129.15 |
| 5,649,687 A | 7/1997 | Rosas et al. | |
| 5,685,519 A | 11/1997 | Bircann et al. | |
| 5,687,698 A | 11/1997 | Mastro et al. | |
| 5,788,213 A | 8/1998 | Kanda et al. | |
| 5,878,779 A | 3/1999 | Bircann et al. | |
| 6,209,529 B1 | 4/2001 | Everingham | |
| 6,247,456 B1 | 6/2001 | Everingham et al. | |
| 6,450,152 B1 | 9/2002 | Everingham | |
| 6,498,558 B1 | 12/2002 | Linkner, Jr. et al. | |
| 6,772,743 B2 | 8/2004 | Nydam | |
| 6,903,647 B2 | 6/2005 | Linkner, Jr. et al. | |
| 6,918,571 B1 | 7/2005 | Rose | |
| 7,422,193 B2 | 9/2008 | Sisk et al. | |
| 8,231,104 B2 | 7/2012 | Voss | |
| 8,256,393 B2 | 9/2012 | Simpson et al. | |
| 9,068,482 B2 | 6/2015 | Methley | |
| 9,163,746 B2 | 10/2015 | Voss et al. | |
| 9,324,488 B2 | 4/2016 | Dayton | |
| 9,423,046 B2 | 8/2016 | Bamber et al. | |
| 9,500,291 B2 | 11/2016 | Pifer et al. | |
| 9,587,748 B2 | 3/2017 | Taguchi | |
| 9,790,831 B2 | 10/2017 | Stang | |
| 10,895,223 B2 * | 1/2021 | Dayton | F02M 25/08 |
| 2001/0017160 A1 | 8/2001 | Ishigaki et al. | |
| 2001/0017360 A1 | 8/2001 | Watanabe et al. | |
| 2002/0104979 A1 | 8/2002 | Kato | |
| 2002/0112702 A1 | 8/2002 | Weldon et al. | |
| 2004/0105209 A1 | 6/2004 | Gerlich et al. | |
| 2005/0061302 A1 | 3/2005 | Tatsu et al. | |
| 2005/0166979 A1 | 8/2005 | Berger et al. | |
| 2005/0217734 A1 | 10/2005 | Takakura | |
| 2006/0145113 A1 | 7/2006 | Dayton | |
| 2006/0185652 A1 | 8/2006 | Tsuge et al. | |
| 2006/0185735 A1 | 8/2006 | Tsuge et al. | |
| 2007/0151614 A1 | 7/2007 | Dayton et al. | |
| 2008/0216899 A1 | 9/2008 | Moreno et al. | |
| 2010/0156582 A1 | 6/2010 | Zelmer et al. | |
| 2010/0269921 A1 | 10/2010 | Pifer et al. | |
| 2010/0294966 A1 | 11/2010 | Czimmek et al. | |
| 2011/0162728 A1 | 7/2011 | Pifer et al. | |
| 2011/0240145 A1 | 10/2011 | Pifer | |
| 2011/0284781 A1 | 11/2011 | Keller et al. | |
| 2012/0055943 A1 | 3/2012 | Muller-Riederer et al. | |
| 2013/0009083 A1 * | 1/2013 | Ozaki | H01F 7/1607 251/129.15 |
| 2013/0112290 A1 | 5/2013 | Gerlich et al. | |
| 2014/0145100 A1 * | 5/2014 | Ishibashi | F02M 21/0215 251/129.15 |
| 2014/0145101 A1 * | 5/2014 | Ishibashi | F16K 31/0675 251/129.15 |
| 2014/0264113 A1 | 9/2014 | Grover | |
| 2014/0331976 A1 | 11/2014 | Tsumoto et al. | |
| 2015/0000772 A1 | 1/2015 | Onodera | |
| 2015/0027571 A1 | 1/2015 | Kishi et al. | |
| 2015/0048270 A1 | 2/2015 | Bamber et al. | |
| 2015/0061799 A1 | 3/2015 | Dayton | |
| 2015/0096633 A1 | 4/2015 | Pifer et al. | |
| 2015/0096636 A1 | 4/2015 | Dayton et al. | |
| 2015/0101577 A1 | 4/2015 | Balsdon et al. | |
| 2015/0101677 A1 | 4/2015 | Balsdon et al. | |
| 2015/0101689 A1 | 4/2015 | Balsdon et al. | |
| 2015/0102039 A1 | 4/2015 | Balsdon et al. | |
| 2015/0144819 A1 | 5/2015 | Pifer et al. | |
| 2015/0345652 A1 | 12/2015 | Jefford et al. | |
| 2016/0033046 A1 | 2/2016 | Taguchi | |
| 2016/0123490 A1 | 5/2016 | McLauchlan et al. | |
| 2017/0074745 A1 | 3/2017 | Ambrose et al. | |
| 2017/0271115 A1 * | 9/2017 | Wardle | H01H 51/06 |
| 2019/0048829 A1 * | 2/2019 | Dayton | F16K 31/02 |

FOREIGN PATENT DOCUMENTS

| | | |
|---|---|---|
| KR | 101076231 B1 | 10/2011 |
| WO | 2016106310 A1 | 6/2016 |
| WO | 2017181084 A1 | 10/2017 |

OTHER PUBLICATIONS

International Search Report and Written Opinion of International Application No. PCT/US2017/027730 dated Sep. 19, 2017, 13 pages.

Supplementary European Search Report for EP Application No. 17 79 3293 dated Nov. 19, 2019.

European Office Action for EP Application No. 17783293.8 dated Apr. 8, 2021.

* cited by examiner

VAPOR IMPERMEABLE SOLENOID FOR FUEL VAPOR ENVIRONMENT

CROSS-REFERENCE TO RELATED APPLICATIONS

This application is a continuation of U.S. patent application Ser. No. 16/160,462, filed Oct. 15, 2018, which is a continuation-in-part of International Application No. PCT/US2017/027730 filed Apr. 14, 2017, which claims the benefit of U.S. Provisional Application No. 62/323,356, filed Apr. 15, 2016, and U.S. Provisional Application No. 62/350,309, filed Jun. 15, 2016, the contents of which are incorporated herein by reference thereto.

FIELD

The present disclosure relates generally to vehicle fuel tank systems and, more particularly, to a fuel tank isolation valve assembly having a vapor impermeable solenoid assembly.

BACKGROUND

Some vehicles include specifically designed evaporative emissions systems to prevent fuel vapors from escaping a fuel system of the vehicle. In some systems, valves are utilized to prevent fuel vapors from venting directly to the atmosphere. In typical evaporative emissions systems, vented vapors from the fuel system are directed to a purge canister containing activated charcoal. The activated charcoal can be extremely porous, which provides a large surface area for adsorption of fuel vapors and/or chemical reactions. During some engine operational modes, with the help of specifically designed control valve, the fuel vapors are adsorbed within the canister. Subsequently, during other engine operational modes, and with additional control valves, fresh air is dawn through the canister to pull the stored fuel vapor into the engine for combustion thereof.

In hybrid vehicles having both electric and gas engines, the electric engine may be used for extended periods of time and the purge canister may be become overwhelmed by fuel vapor. A fuel tank isolation valve assembly may be utilized to prevent fuel vapors from traveling to and overwhelming the purge canister. While such systems work for their intended purpose, there remains a need for an improved fuel tank isolation valve assembly.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to various aspects of the present disclosure a vapor impermeable solenoid for a fuel tank isolation valve assembly is provided. The vapor impermeable solenoid includes an outer housing defining an inner cavity, windings configured to generate a magnetic flux when energized, and a flux collector configured to direct the magnetic flux. An armature tube is disposed within the inner cavity inboard of the flux collector and formed of a magnetic and vapor impermeable material configured to prevent fuel vapor molecules from passing therethrough. A pole piece is disposed within the armature tube, and a magnetic armature is disposed within the armature tube and operably coupled to a seal configured to selectively seal a passage that allows fuel vapor to pass to a purge canister. The magnetic armature is configured to move from a first position to a second position when an electric current is applied to the windings.

In addition to the foregoing, the described vapor impermeable solenoid may include one or more of the following features: an O-ring disposed in a groove formed in an outer surface of the armature tube; wherein the armature tube includes a flange to bound a first side of the O-ring; a disk to bound a second side of the O-ring that is opposite the first side; a frame member coupled to the seal; and a biasing mechanism disposed between the frame member and the disk, the biasing mechanism configured bias the frame member and the seal away from the disk.

In addition to the foregoing, the described vapor impermeable solenoid may include one or more of the following features: wherein the armature tube is fabricated from a corrosion resistant metallic material to facilitate preventing a corrosive surface from forming on an inside diameter due to exposure to water dissolved in fuel; wherein the armature tube defines an open end and a closed end, the pole piece being secured inside of and to the armature tube at the closed end; and wherein the first position is a sealed position preventing flow of the fuel vapor to the purge canister, and the second position is an unsealed position allowing flow of the fuel vapor to the purge canister.

In addition to the foregoing, the described vapor impermeable solenoid may include one or more of the following features: wherein the magnetic armature includes a first end having a frustoconical shape; an encapsulated coil assembly that includes the windings; wherein the encapsulated coil assembly further includes a bobbin having an armature portion and a terminal portion; wherein the windings are disposed about the armature portion, and a terminal is coupled to the terminal portion, the terminal electrically coupled to the windings; and a voltage suppressor disposed within a recess formed in the terminal portion.

In addition to the foregoing, the described vapor impermeable solenoid may include one or more of the following features: an encapsulation material disposed about and at least partially encapsulating the windings, the bobbin, and the terminal; wherein the armature tube is formed of stainless steel and is disposed inboard of the bobbin; wherein the magnetic armature includes at least one groove formed therein configured to receive a bearing to facilitate sliding movement of the magnetic armature within the armature tube; and wherein the outer housing is a metal liner configured to prevent fuel vapor molecules from passing therethrough.

According to various aspects of the present disclosure a fuel tank isolation valve assembly for a fuel tank system having a fuel tank coupled to a purge canister via a fuel vapor vent line is provided. The fuel tank isolation valve assembly includes a vent passage having a vapor inlet port and a vapor outlet port, and a vapor impermeable solenoid assembly operably coupled to the vent passage. The vapor impermeable solenoid assembly includes an outer housing defining an inner cavity, windings configured to generate a magnetic flux when energized, and a flux collector configured to direct the magnetic flux. An armature tube is disposed within the inner cavity inboard of the flux collector and formed of a magnetic and vapor impermeable material configured to prevent fuel vapor molecules from passing therethrough. A pole piece is disposed within the armature tube, and a magnetic armature is disposed within the armature tube and operably coupled to a seal configured to selectively seal the vent passage that allows fuel vapor to pass to purge canister. The magnetic armature is configured to move from a first position to a second position when an electric current is applied to the windings.

According to various aspects of the present disclosure a vehicle fuel tank system is provided. The vehicle fuel tank system includes a fuel tank, a purge canister, a conduit fluidly coupling the fuel tank and the purge canister, and a fuel tank isolation valve assembly disposed within the conduit and configured to selectively fluidly isolate the fuel tank from the purge canister. The valve assembly includes a vent passage having a vapor inlet port and a vapor outlet port, and a vapor impermeable solenoid assembly operably coupled to the vent passage. The vapor impermeable solenoid assembly includes an outer housing defining an inner cavity, windings configured to generate a magnetic flux when energized, and a flux collector configured to direct the magnetic flux. An armature tube is disposed within the inner cavity inboard of the flux collector and formed of a magnetic and vapor impermeable material configured to prevent fuel vapor molecules from passing therethrough. A pole piece is disposed within the armature tube, and a magnetic armature is disposed within the armature tube and operably coupled to a seal configured to selectively seal the vent passage that allows fuel vapor to pass to purge canister. The magnetic armature is configured to move from a first position to a second position when an electric current is applied to the windings.

BRIEF DESCRIPTION OF THE DRAWINGS

The present disclosure will become more fully understood from the detailed description and the accompanying drawings, wherein.

DETAILED DESCRIPTION

The present teachings provide for the prevention of vapor permeation in an inner cavity of a solenoid. In one example, the solenoid is constructed in such a way as to be lined with a deep-drawn metal liner, as shown in accordance with the present teachings in FIGS. 1-6. It will be appreciated in light of the disclosure that fuel vapor molecules cannot pass through the metal liner. Because the interior cavity of the solenoid can be constructed to be exposed to fuel vapor, there are many further circumstances where the solenoid must also be constructed so that vapor cannot escape. Were the fuel vapors to permeate the device, undesirably, the fuel vapors could further escape into the atmosphere.

It will also be appreciated in light of the disclosure that there can be several ways to form a fuel vapor permeation barrier, however many such constructions are not magnetically efficient and therefore can require additional copper windings to ensure the same performance. Accordingly, the present teachings can be shown to provide the needed performance without additional copper windings while preventing permeation of fuel vapor outside the solenoid.

Figure 1:
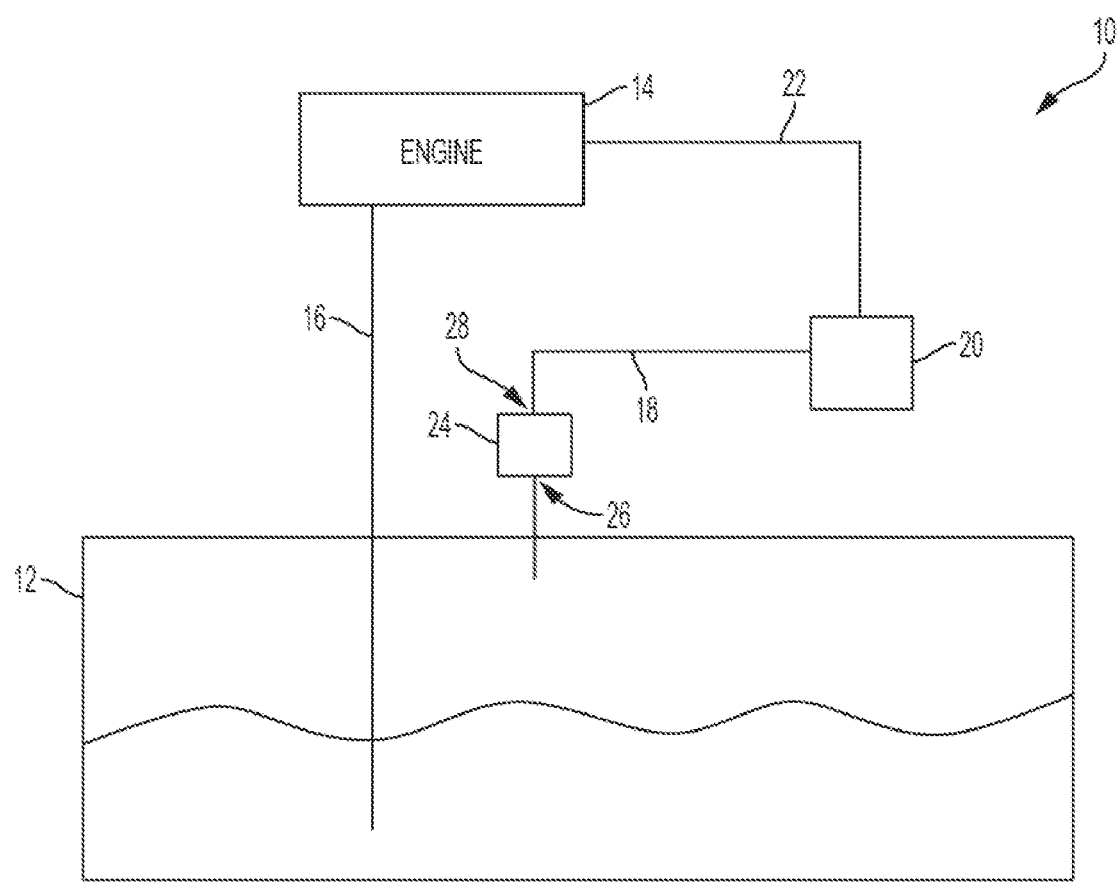
FIG. 1 is a schematic illustration of a fuel tank system constructed in accordance to one example of the present disclosure.

With initial reference to FIG. 1, a fuel tank system constructed in accordance to one example of the present disclosure is shown and generally identified at reference 10. The fuel tank system 10 can generally include a fuel tank 12 fluidly coupled to an internal combustion engine 14 by a fuel supply line 16. A fuel vapor vent line 18 selectively supplies fuel vapor from fuel tank 12 to a purge canister 20 for storage therein. The stored fuel vapor may be subsequently supplied via a purge line 22 to the vehicle engine 14 for combustion therein.

A fuel tank isolation valve assembly 24 can be disposed in fuel vapor vent line 18 to selectively prevent fuel vapor from traveling from the fuel tank 12 to the purge canister 20. Accordingly, the fuel tank isolation valve assembly 24 selectively isolates fuel vapor within the fuel tank 12. In the example embodiment, isolation valve assembly 24 is configured to control vapor flow between the fuel tank 12 and purge canister 20 via an inlet port 26 and an outlet port 28. Inlet port 26 can be fluidly coupled to fuel vapor vent line 18.

Figure 2:
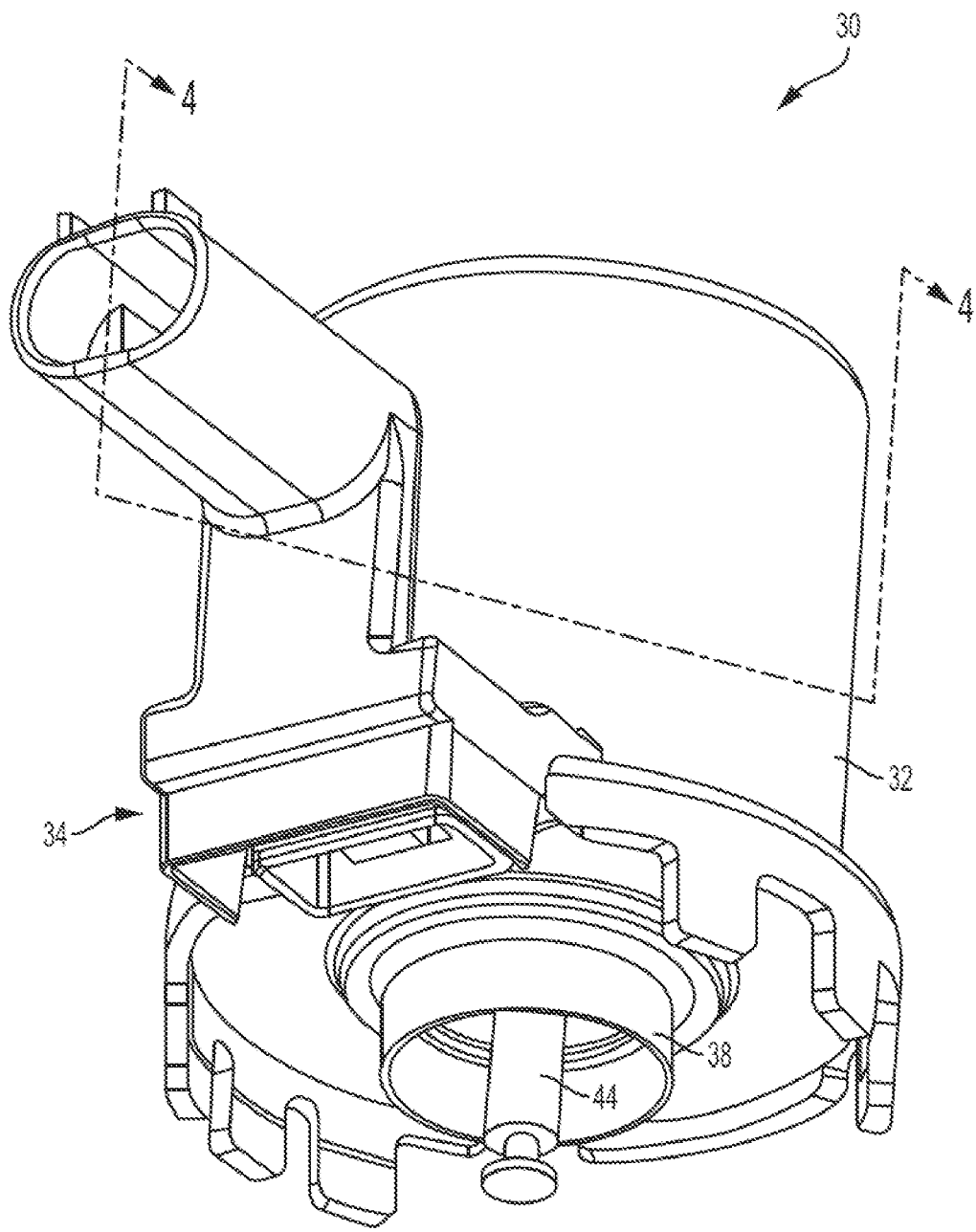
FIG. 2 is a perspective view of a vapor impermeable solenoid assembly that may be used in the system shown in FIG. 1, in accordance to one example of the present disclosure.
Figure 3:
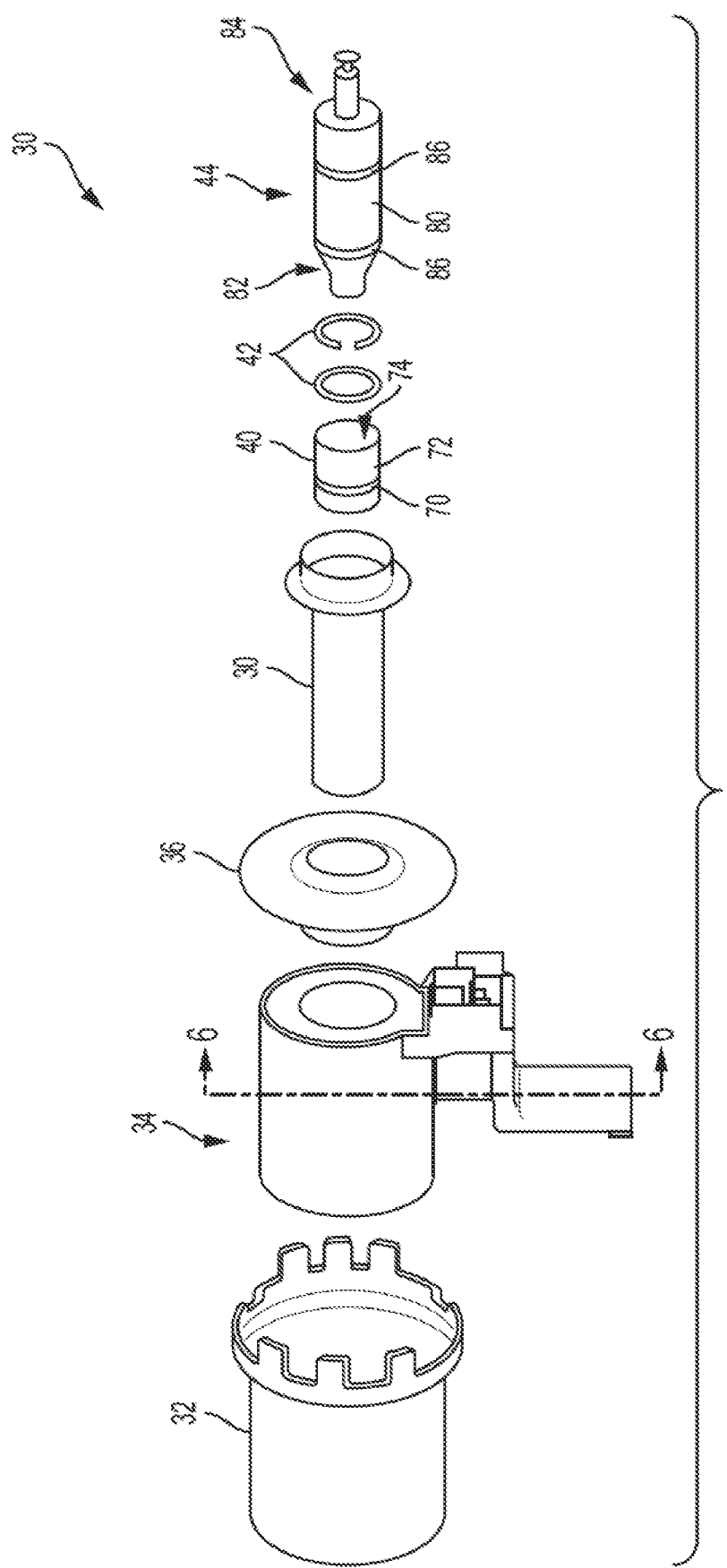
FIG. 3 is an exploded view of the solenoid assembly shown in FIG. 2.
Figure 4:
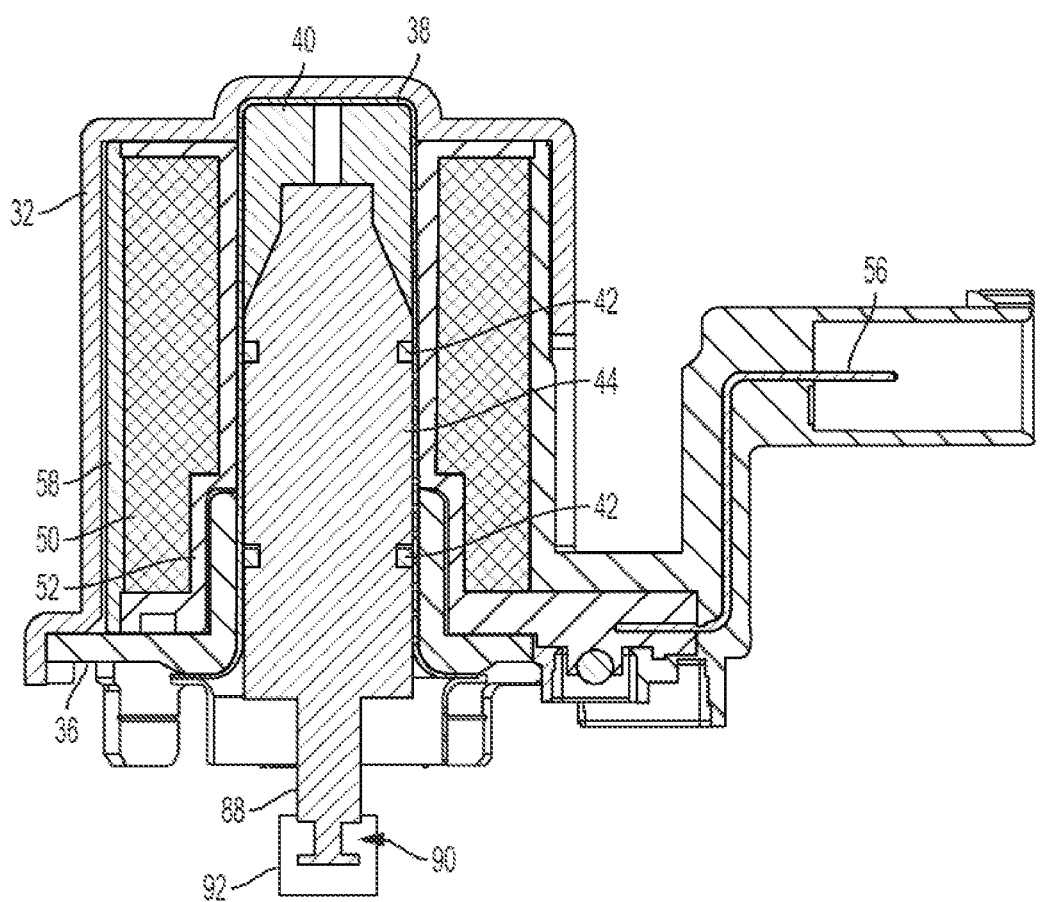
FIG. 4 is a cross-sectional view of the solenoid assembly shown in FIG. 2 and taken along line 4-4.

With further reference to FIGS. 2-4, the fuel tank isolation valve assembly 24 can include a solenoid assembly 30. As shown in FIG. 3, solenoid assembly 30 can generally include an outer housing 32, an encapsulated coil assembly 34, a flux collector 36, an armature tube 38, a pole piece 40, one or more bearings 42, and a magnetic armature 44.

In the example embodiment, the outer housing 32 is a metal liner configured to prevent fuel vapor molecules from passing therethrough. In one example, the outer housing 32 is fabricated from a corrosion resistant material such as stainless steel. However, outer housing 32 may be fabricated from any suitable material that enables housing 32 to function as described herein.

Figure 5:
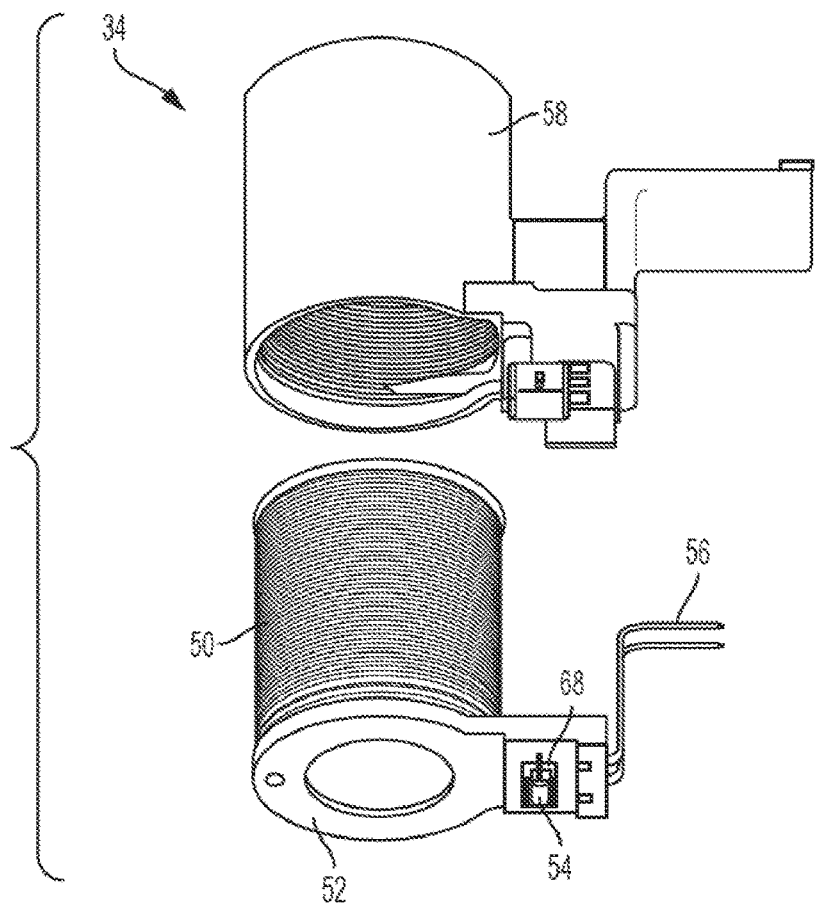
FIG. 5 is an exploded view of an encapsulated coil assembly shown in FIG. 3, in accordance to one example of the present disclosure.
Figure 6:
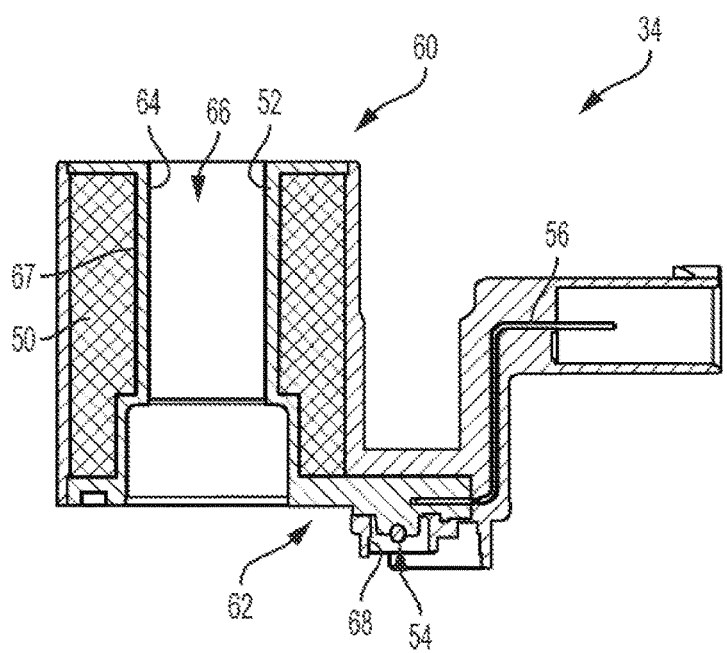
FIG. 6 is a cross-sectional view of the encapsulated coil assembly shown in FIG. 3 and taken along line 6-6.

With additional reference to FIGS. 5 and 6, encapsulated coil assembly 34 is described in more detail. In the example embodiment, encapsulated coil assembly 34 generally includes coils or windings 50, a bobbin 52, a transient voltage suppressor 54, a terminal 56, and encapsulation material 58. Windings 50 may be copper and can be disposed about bobbin 52, which can be configured to support and/or space windings 50, flux collector 36, and/or armature tube 38.

Bobbin 52 can generally include an armature portion 60 and a terminal portion 62. Armature portion 60 includes an inner wall 64 that defines an armature receiving aperture 66, and an outer wall 67 that receives windings 50. Terminal portion 62 includes a recess or pocket 68 that receives voltage suppressor 54, and terminal 56 is inserted into terminal portion 62 for electrically coupling to windings 50. The encapsulation material 58 can then be disposed about the windings 50, bobbin 52, voltage suppressor 54, and terminal 56 once assembled.

In the example embodiment, the flux collector 36 is configured to collect flux at the outer diameter of the housing 32 and route the flux to the magnetic armature 44. The armature tube 38 can be disposed inboard of the bobbin 52 and the flux collector 36. In one example, the armature tube 38 is fabricated from a corrosion resistant material to facilitate preventing a corrosive surface from forming on the inside diameter due to exposure to water dissolved into the fuel. For example, armature tube 38 may be fabricated from a ferritic stainless steel such as alloy 430 SST.

The pole piece 40 can be disposed within an upper portion of the armature tube 38. In one example, the pole piece 40 includes a groove 70 formed in an outer surface 72 thereof. During installation, a portion of the armature tube 38 can be crimped or pressed into the groove 70 to secure the pole piece 40 in a desired location within the armature tube 38. However, alternative methods of securing the pole piece 40 within the armature tube 38 are envisioned (e.g., via welding or fasteners). As shown, pole piece 40 can include a receiving aperture 74 (FIG. 3) configured to selectively receive a portion of the magnetic armature 44. In some examples, receiving aperture 74 can have a shape that is complementary to or generally complementary to a shape of a portion of the magnetic armature 44.

The magnetic armature 44 can be slidably disposed within the armature tube 38 and can generally include a body 80 having a first end 82 and a second end 84. The body 80 can include one or more grooves 86 (FIG. 3) configured to each receive one bearing 42 that facilitates movement of the magnetic armature 44 sliding up and down within the armature tube 38. As discussed herein, the first end 82 can have a shape configured to be received within receiving aperture 74 of pole piece 40. In the illustrated example, receiving aperture 74 and first end 82 can have a frustoconical or generally frustoconical shape. However, receiving aperture 74 and first end 82 can have various shapes and sizes.

The second end 84 can include an arm 88 extending from the body 80. The arm 88 can include a groove 90 or other feature configured to receive a seal or other feature 92 that is configured to block a passage (not shown) and prevent fuel vapor from passing from the fuel tank 12 to the purge canister 20. As such, arm 88 can couple to portions of the fuel tank isolation valve assembly 24, and movement of the armature 44 can selectively unplug conduit 18 to let fuel vapor travel to the purge canister 20.

In operation, the fuel tank isolation valve assembly 24 is generally moved between a sealed position and an unsealed position. In the sealed position, valve assembly 24 prevents fuel vapor from passing from the fuel tank 12 to the purge canister 20. In the unsealed position, the valve assembly 24 enables fuel vapor to pass from the fuel tank 12 to the purge canister. In one example, the valve assembly 24 is in the sealed position by default.

Upon providing electric current to the windings 50 via the terminals 56, a magnetic flux path is induced, which travels up the flux collector 36, across the armature tube 38, and to the armature 44. The magnetic flux causes the armature 44 to close the gap to the pole piece 40, thereby moving the armature 44 upwards and drawing the arm 88 upwards. This movement opens the fuel tank isolation valve assembly 24 and allows fuel vapor to travel to the purge canister 20. In some examples, valve assembly 24 is energized (i.e., moved to the unsealed position) during car refueling (e.g., when the lever pulled to open fuel door) and when the vehicle is transitioned to operating the internal combustion engine 14. The valve assembly 24 may be deenergized (i.e., moved to the sealed position) when, for example, an electric motor (not shown) is being utilized.

Figure 7:
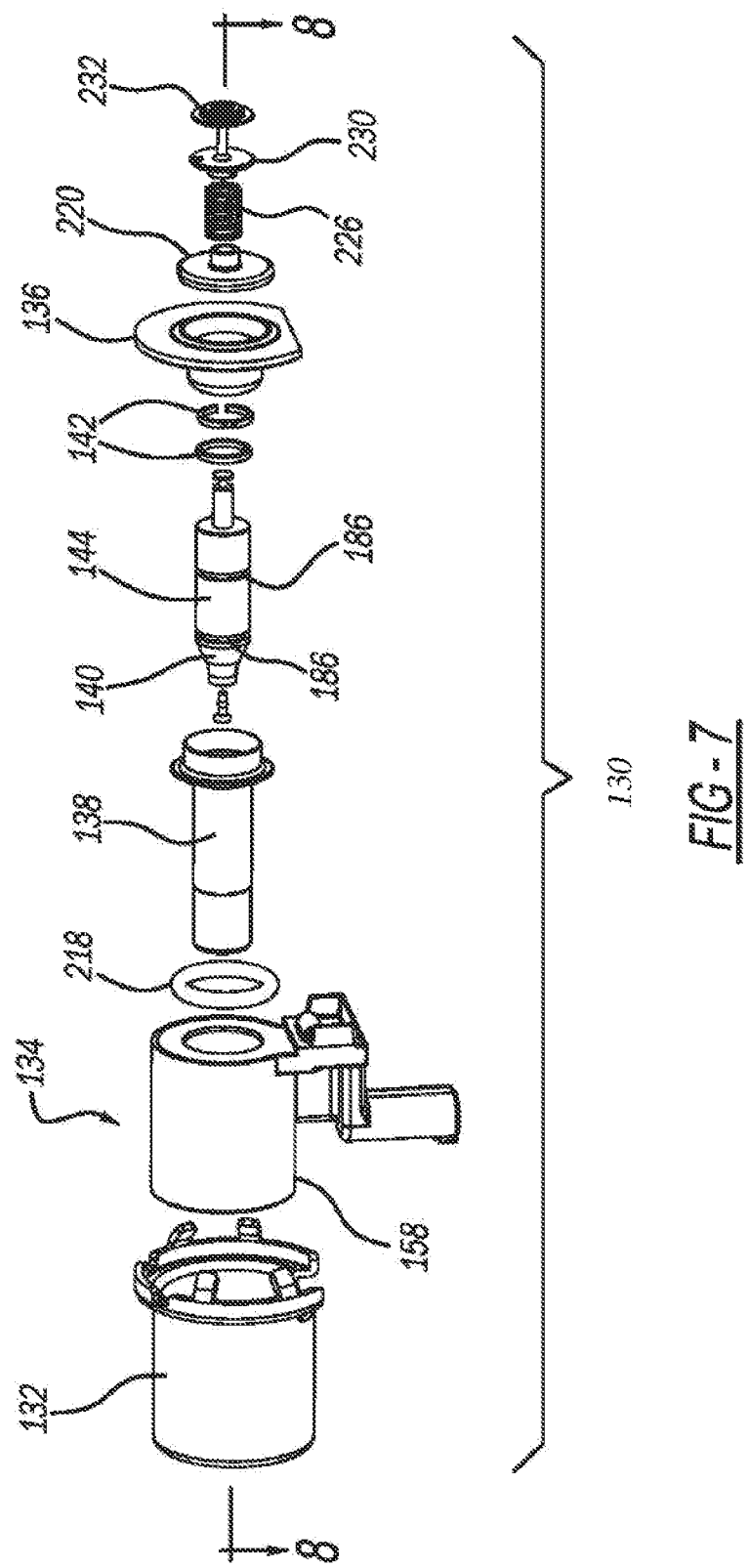
FIG. 7 is an exploded view of a solenoid assembly constructed in accordance to additional features of the present disclosure.
Figure 8:
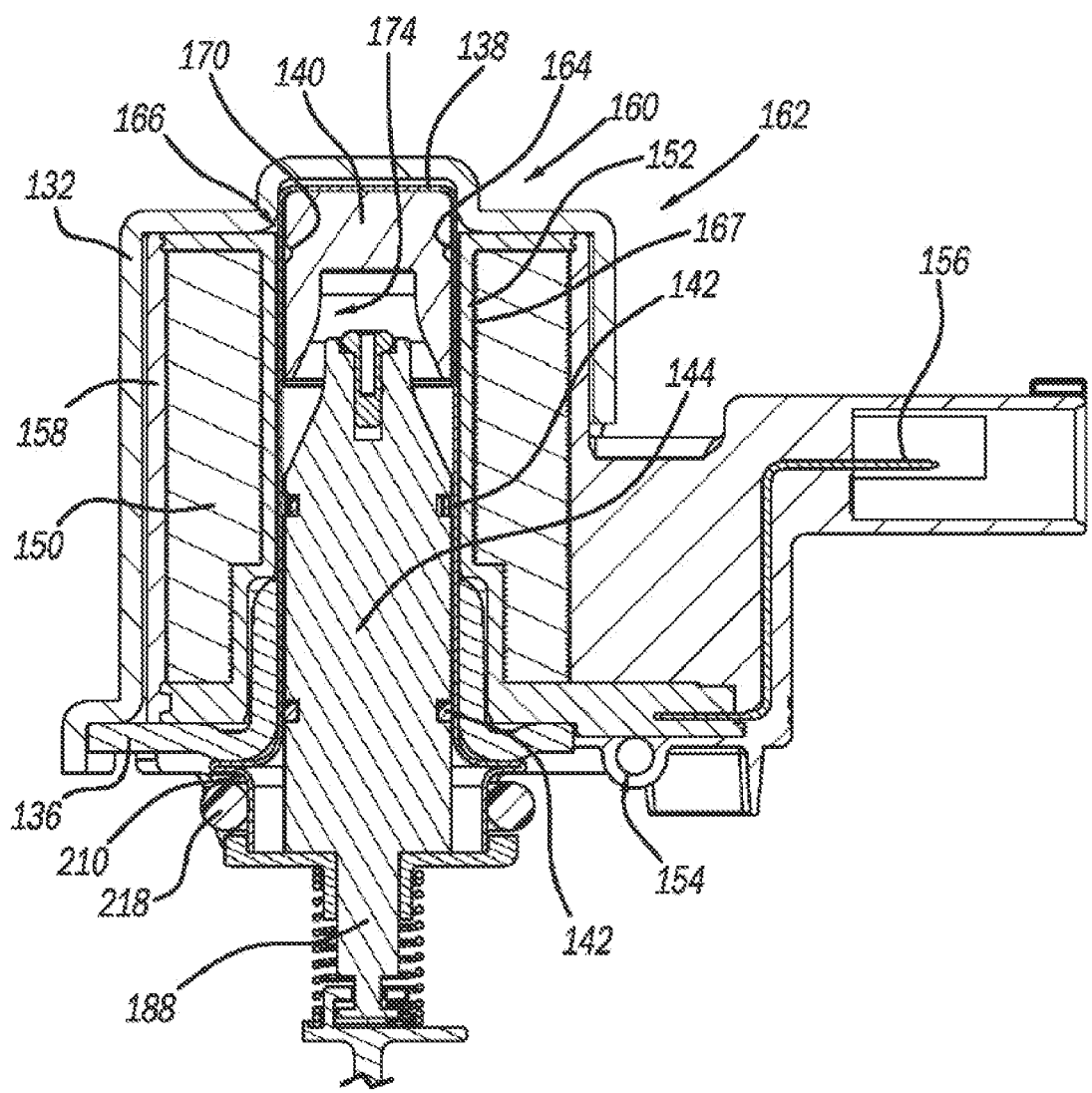
FIG. 8 is a cross-sectional view of the solenoid assembly shown in FIG. 7 and taken along line 8-8.

With reference to FIGS. 7 and 8, a solenoid assembly 130 constructed in accordance to another example of the present disclosure is shown. Unless otherwise described herein, the solenoid assembly 130 operates similar to the solenoid assembly 30. Like components are denoted with like reference numerals increased by 100. The solenoid assembly 130 includes an outer housing 132, an encapsulated coil assembly 134, a flux collector 136, an armature tube 138, a pole piece 140, one or more bearings 142 and a magnetic armature 144. The outer housing 132 is a metal liner configured to prevent fuel vapor molecules from passing therethrough. In one example, the outer housing 132 is fabricated from a corrosion resistant material such as stainless steel. However, outer housing 132 may be fabricated from any suitable material that enables housing 132 to function as described herein.

The encapsulated coil assembly 134 generally includes coils or windings 150, a bobbin 152, a transient voltage suppressor 154, a terminal 156, and encapsulation material 158. Windings 150 may be copper and can be disposed about bobbin 152, which can be configured to support and/or space windings 150, flux collector 136, and/or armature tube 138.

Bobbin 152 can generally include an armature portion 160 and a terminal portion 162. Armature portion 160 includes an inner wall 164 that defines an armature receiving aperture 166, and an outer wall 167 that receives windings 150. Terminal portion 162 receives voltage suppressor 154, and terminal 156 is inserted into terminal portion 162 for electrically coupling to windings 150. The encapsulation material 158 can then be disposed about the windings 150, bobbin 152, voltage suppressor 154, and terminal 156 once assembled.

In the example embodiment, the flux collector 136 is configured to collect flux at the outer diameter of the housing 132 and route the flux to the magnetic armature 144. The armature tube 138 can be disposed inboard of the bobbin 152 and the flux collector 136. In one example, the armature tube 138 is fabricated from a corrosion resistant material to facilitate preventing a corrosive surface from forming on the inside diameter due to exposure to water dissolved into the fuel. For example, armature tube 138 may be fabricated from a ferritic stainless steel such as allow 430 SST. While popular convention would suggest that the armature tube 138 (and 38) should be formed of non-magnetic material, the armature tube 138 (and 38) are formed of magnetic material to yield advantages over the prior art. In this regard, by incorporating an armature tube 138 formed of magnetic material, less copper is required to be used at the windings 150 while still providing equivalent results. As a result, cost savings can be realized with the armature tube 138 (and 38) of the instant application.

The pole piece 140 can be disposed within an upper portion of the armature tube 138. In one example, the pole piece 140 includes a groove 170 formed in an outer surface thereof. During installation, a portion of the armature tube 138 can be crimped or pressed into the groove 170 to secure the pole piece 140 in a desired location within the armature tube 138. However, alternative methods of securing the pole piece 140 within the armature tube 138 are envisioned (e.g., via welding or fasteners). As shown, pole piece 40 can include a receiving aperture 174 (FIG. 8) configured to selectively receive a portion of the magnetic armature 144. In some examples, receiving aperture 174 can have a shape that is complementary to or generally complementary to a shape of a portion of the magnetic armature 144.

The magnetic armature 144 can include one or more grooves 186 configured to each receive one bearing 142 that facilitates movement of the magnetic armature 144 sliding up and down within the armature tube 138. The armature tube 138 can be formed with an o-ring groove 210 for receiving an o-ring 218. A disk 220 can bound the o-ring 218 on an opposite end thereof. A biasing member 226 can bias a frame member 230 and seal 232 away from the disk 220.

Described herein are systems and methods for a fuel vapor impermeable solenoid assembly. The systems include a vapor impermeable housing disposed about an encapsulated coil assembly, a flux collector, an armature tube, a pole piece, and a magnetic armature. The interior cavity of the solenoid assembly can be exposed to fuel vapor without allowing the fuel vapor to escape. Accordingly, the system prevents vapor from permeating the device to the environment.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A vapor impermeable solenoid for a fuel tank isolation valve assembly, the vapor impermeable solenoid comprising:
    an outer housing defining an inner cavity;
    windings configured to generate a magnetic flux when energized;
    a flux collector configured to direct the magnetic flux;
    an armature tube disposed within the inner cavity inboard of the flux collector and formed of a magnetic material, the armature tube having an outer surface that defines a groove that receives an o-ring;
    a pole piece disposed within the armature tube; and
    a magnetic armature disposed within the armature tube.

2. The vapor impermeable solenoid of claim 1, wherein the armature tube includes a flange to bound a first side of the o-ring.

3. The vapor impermeable solenoid of claim 2, further comprising a disk to bound a second side of the o-ring that is opposite the first side.

4. The vapor impermeable solenoid of claim 3, further comprising a frame member coupled to the seal, wherein the seal is operably coupled to the magnetic armature and configured to selectively seal a passage that allows fuel vapor to pass to a purge canister.

5. The vapor impermeable solenoid of claim 4, further comprising a biasing mechanism disposed between the frame member and the disk, the biasing mechanism configured bias the frame member and the seal away from the disk.

6. The vapor impermeable solenoid of claim 1, wherein the armature tube is fabricated from a corrosion resistant metallic material to facilitate preventing a corrosive surface from forming on an inside diameter due to exposure to water dissolved in fuel.

7. The vapor impermeable solenoid of claim 1, wherein the armature tube defines an open end and a closed end, the pole piece being secured inside of and to the armature tube at the closed end.

8. The vapor impermeable solenoid of claim 1, wherein the magnetic armature is configured to move from a first position to a second position when an electric current is applied to the windings, wherein the first position is a sealed position preventing flow of fuel vapor to a purge canister, and the second position is an unsealed position allowing flow of the fuel vapor to the purge canister.

9. The vapor impermeable solenoid of claim 1, wherein the magnetic armature includes a first end having a frusto-conical shape.

10. The vapor impermeable solenoid of claim 1, further comprising an encapsulated coil assembly that includes the windings.

11. The vapor impermeable solenoid of claim 10, wherein the encapsulated coil assembly further includes a bobbin having an armature portion and a terminal portion.

12. The vapor impermeable solenoid of claim 11, wherein the windings are disposed about the armature portion, and a terminal is coupled to the terminal portion, the terminal electrically coupled to the windings.

13. The vapor impermeable solenoid of claim 12, further comprising a voltage suppressor disposed within a recess formed in the terminal portion.

14. The vapor impermeable solenoid of claim 12, further comprising an encapsulation material disposed about and at least partially encapsulating the windings, the bobbin, and the terminal.

15. The vapor impermeable solenoid of claim 14, wherein the magnetic armature includes at least one groove formed therein configured to receive a bearing to facilitate sliding movement of the magnetic armature within the armature tube.

16. The vapor impermeable solenoid of claim 11, wherein the armature tube is formed of stainless steel and is disposed inboard of the bobbin.

17. The vapor impermeable solenoid of claim 1, wherein the outer housing is a metal liner configured to prevent fuel vapor molecules from passing therethrough.

18. A fuel tank isolation valve assembly for a fuel tank system having a fuel tank coupled to a purge canister via a fuel vapor vent line, the fuel tank isolation valve assembly comprising:
    a vent passage having a vapor inlet port and a vapor outlet port; and
    a vapor impermeable solenoid assembly operably coupled to the vent passage, the vapor impermeable solenoid assembly comprising:
    an outer housing defining an inner cavity;
    windings configured to generate a magnetic flux when energized;
    a flux collector configured to direct the magnetic flux;
    an armature tube disposed within the inner cavity inboard of the flux collector and formed of a magnetic material, the armature tube having an outer surface that defines a groove that receives an o-ring;
    a pole piece disposed within the armature tube; and
    a magnetic armature disposed within the armature tube.

19. A vehicle fuel tank system comprising:
    a fuel tank;
    a purge canister;
    a conduit fluidly coupling the fuel tank and the purge canister; and
    a fuel tank isolation valve assembly disposed within the conduit and configured to selectively fluidly isolate the fuel tank from the purge canister, the fuel tank isolation valve assembly comprising:
    a vent passage having a vapor inlet port and a vapor outlet port; and a vapor impermeable solenoid assembly operably coupled to the vent passage, the vapor impermeable solenoid assembly comprising:
an outer housing defining an inner cavity;
windings configured to generate a magnetic flux when energized;
a flux collector configured to direct the magnetic flux;
an armature tube disposed within the inner cavity inboard of the flux collector and formed of a magnetic material, the armature tube having an outer surface that defines a groove that receives an o-ring;
a pole piece disposed within the armature tube; and
a magnetic armature disposed within the armature tube.

\* \* \* \* \*